(12) United States Patent
Quinnell et al.

(10) Patent No.: US 8,037,118 B2
(45) Date of Patent: Oct. 11, 2011

(54) THREE-PATH FUSED MULTIPLY-ADDER CIRCUIT

(75) Inventors: Eric Quinnell, Austin, TX (US); Earl E. Swartzlander, Jr., Austin, TX (US); Carl Lemonds, Austin, TX (US)

(73) Assignee: Eric Quinnell, Austin, TX (US)

( * ) Notice: Subject to any disclaimer, the term of this patent is extended or adjusted under 35 U.S.C. 154(b) by 854 days.

(21) Appl. No.: 12/082,127

(22) Filed: Apr. 9, 2008

(65) Prior Publication Data

US 2008/0256150 A1 Oct. 16, 2008

Related U.S. Application Data

(60) Provisional application No. 60/911,018, filed on Apr. 10, 2007.

(51) Int. Cl.
*G06F 7/483* (2006.01)

(52) U.S. Cl. ....................................................... 708/501

(58) Field of Classification Search .................. None
See application file for complete search history.

(56) References Cited

U.S. PATENT DOCUMENTS

| | | | | |
|---|---|---|---|---|
| 7,461,117 B2* | 12/2008 | Trong et al. | ................ | 708/501 |
| 7,840,622 B2* | 11/2010 | Gerwig et al. | ................ | 708/204 |
| 2008/0256161 A1* | 10/2008 | Quinnell et al. | ................ | 708/501 |
| 2008/0256162 A1* | 10/2008 | Henry et al. | ................ | 708/523 |
| 2009/0077152 A1* | 3/2009 | Powell et al. | ................ | 708/501 |
| 2009/0248779 A1* | 10/2009 | Brooks et al. | ................ | 708/523 |
| 2011/0040815 A1* | 2/2011 | Penton et al. | ................ | 708/205 |

* cited by examiner

*Primary Examiner* — David H Malzahn

(57) ABSTRACT

A three-path floating-point fused multiply-adder is disclosed. The fused multiply-adder is for the single instruction execution of (A×B)+C. The three-path fused multiply-adder is based on a dual-path adder and reduces latency significantly by operating on case data in parallel and by reducing component bit size. The fused multiply-adder is a common serial fused multiply-adder that reuses floating-point adder (FPA) and floating-point multiplier (FPM) hardware, allowing single adds, single multiplies, and fused multiply-adds to execute at maximum speed.

1 Claim, 6 Drawing Sheets

US 8,037,118 B2

THREE-PATH FUSED MULTIPLY-ADDER CIRCUIT

PRIORITY CLAIM

The present application claims priority under 35 U.S.C. §119(e)(1) to provisional application No. 60/911,018 filed on Apr. 10, 2007, the contents of which are incorporated herein by reference.

BACKGROUND OF THE INVENTION

1. Technical Field

The present invention relates to digital circuits in general, and, in particular, to fused multiply-adder circuits. Still more particularly, the present invention relates to a three-path fused multiply-adder circuit.

2. Description of Related Art

A floating-point unit is designed to perform various mathematical operations on floating-point numbers. It is always useful to enhance the speed of a floating-point unit, and one known technique is to provide specialized hardware to implement certain floating-point functions. For example, a fused multiply-adder circuit can be implemented within a floating-point unit to perform multiply-accumulate functions that are commonly used in digital signal processing operations.

A fused multiply-adder circuit basically combines a multiplication operation with an add operation to perform a single instruction execution of the equation (A×B)+C. Within a fused multiply-adder circuit, a multiplicand and a multiplier are initially multiplied via a partial product generation module. The partial products are then added by a partial product reduction module that reduces the partial products to a Sum and a Carry in their redundant form. The redundant Sum and Carry are further added to an addend via a carry-save adder to form a second redundant Sum and a second redundant Carry. The second redundant Sum and the second redundant Carry are subsequently added within a carry-propagate adder to yield a Sum Total.

Since the early 1990s, a plethora of algorithms that utilize the (A×B)+C single-instruction equation have been introduced for applications in digital signal processing and graphics processing. To complement the ever increasing usage of the fused multiply-add instruction, the floating-point adder (FPA) and floating-point multiplier (FPM) of some chips are entirely replaced with a fused multiply-adder by using constants, such as (A×B)+0.0 for single multiplies and (A×1.0)+C for single adds. The combination of industrial implementation and increasing algorithmic activities has prompted the IEEE 754R committee to consider the inclusion of the fused multiply-add instruction into the IEEE standard for floating-point arithmetic.

SUMMARY OF THE INVENTION

In accordance with a preferred embodiment of the present invention, a three-path fused multiply-adder circuit includes an adder anchor path, a product anchor path and a close path. The three-path fused multiply-adder circuit also includes a carry-save adder (CSA) tree and an add/round module. The CSA tree multiplies a first operand and a second operand to generate a product. The adder anchor path shifts the product with respect to a third operand. The product anchor path shifts the third input with respect to the product. The close path normalizes a difference between the product and the third operand. Finally, the add/round module selects and finishes an output from one of the three paths to generate a result.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Generally speaking, a fused multiply-adder circuit executes a multiply-accumulate operation within a single operation as $$S=(A \times B)+C$$

Thus, a fused multiply-adder circuit is designed to accept up to three operands as inputs. If certain instructions need fewer than three operands, then a constant is forced into the unused operand. For example, if only the addition of A and C is required, then a constant 1.0 is forced into operand B. The basic principle of operations of a fused multiply-adder can be divided into three separate tasks, as follows:

1. parallel calculation of the true mantissa and exponent;
2. bit alignment of the values to be added (pre-normalization); and
3. addition followed by post normalization.

I. Prior Art Fused Multiply-Adder

Figure 1:
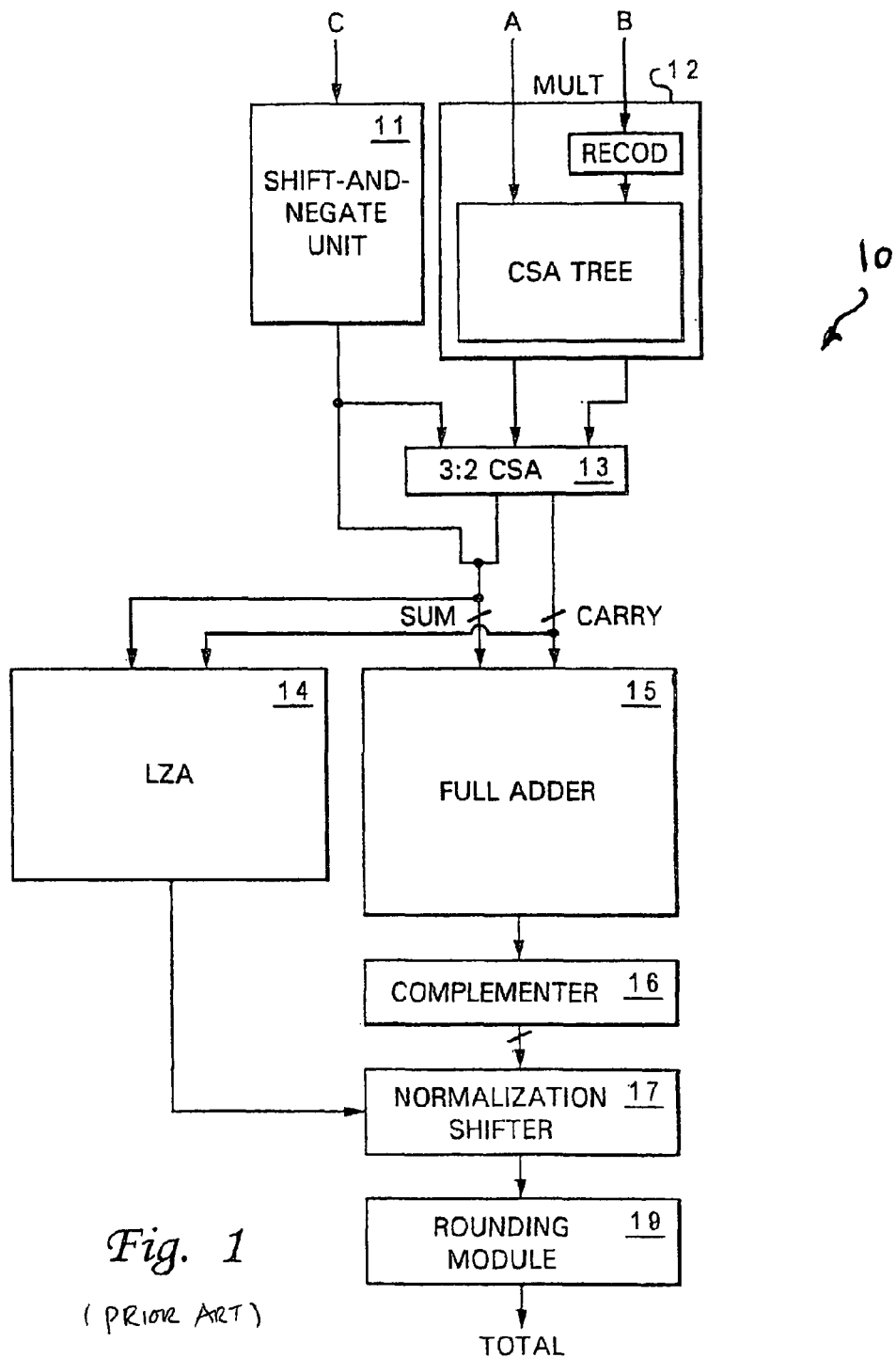
FIG. 1 is a block diagram of a fused multiply-adder, according to the prior art.

Referring now to the drawings and in particular to FIG. 1, there is depicted a block diagram of a fused multiply-adder, according to the prior art. As shown, a fused multiply-adder 10 includes a shift-and-negate module 11, a multiplication module 12, a 3-to-2 carry-save adder (CSA) 13, a leading zero anticipator (LZA) 14, a full adder 15, a complementer 16, a normalization shifter 17, and a rounding module 18. Fused multiply-adder 10 performs a multiply-accumulate operation by initially multiplying a multiplicand A and a multiplier B within multiplication module 12 to produce an intermediate product A×B in a carry-save representation. Within the same pipeline stage, addend C undergoes a bit inversion and bit alignment via shift-and-negate module 11. The bit alignment is performed by placing addend C to the left of the most significant bit of the intermediate product A×B. Two extra bits are placed between addend C and the intermediate product A×B to allow for correct rounding. 3-to-2 CSA 13 is a standard CSA having three inputs and two outputs, the two outputs being the sum and carry outputs. The aligned addend C is added to the carry-save representation of the intermediate product A×B with a 3-to-2 CSA. The most significant bits of the aligned addend C are then concatenated at the output of 3-to-2 CSA 13 to obtain a sum in a carry/save format.

The outputs of 3-to-2 CSA 13 are applied to full adder 15 that adds the sum and carry results from 3-to-2 CSA 13. Although not shown, full adder 15 also includes a carry-in input for receiving a carry-in, and a carry-out output for providing a carry-out if the result of the add operation generates a carry-out. Complementer 16 receives the output of full adder 15 and complements the values received. LZA 14 recognizes the leading zeroes of the sum and carry outputs from 3-to-2 CSA 13. In conjunction with LZA 14, normalization shifter 17 eliminates leading zeroes of the output from complementer 16 by shifting the mantissa as well as incrementing or decrementing the exponent accordingly in order to maximize the accuracy of the output from complementer 16. Rounding module 18 provides the rounding that is required to conform the significance of the multiply-add operation to the required precision, often the original precision of the inputs.

II. Three-Path Fused Multiply-Adder

Figure 2:
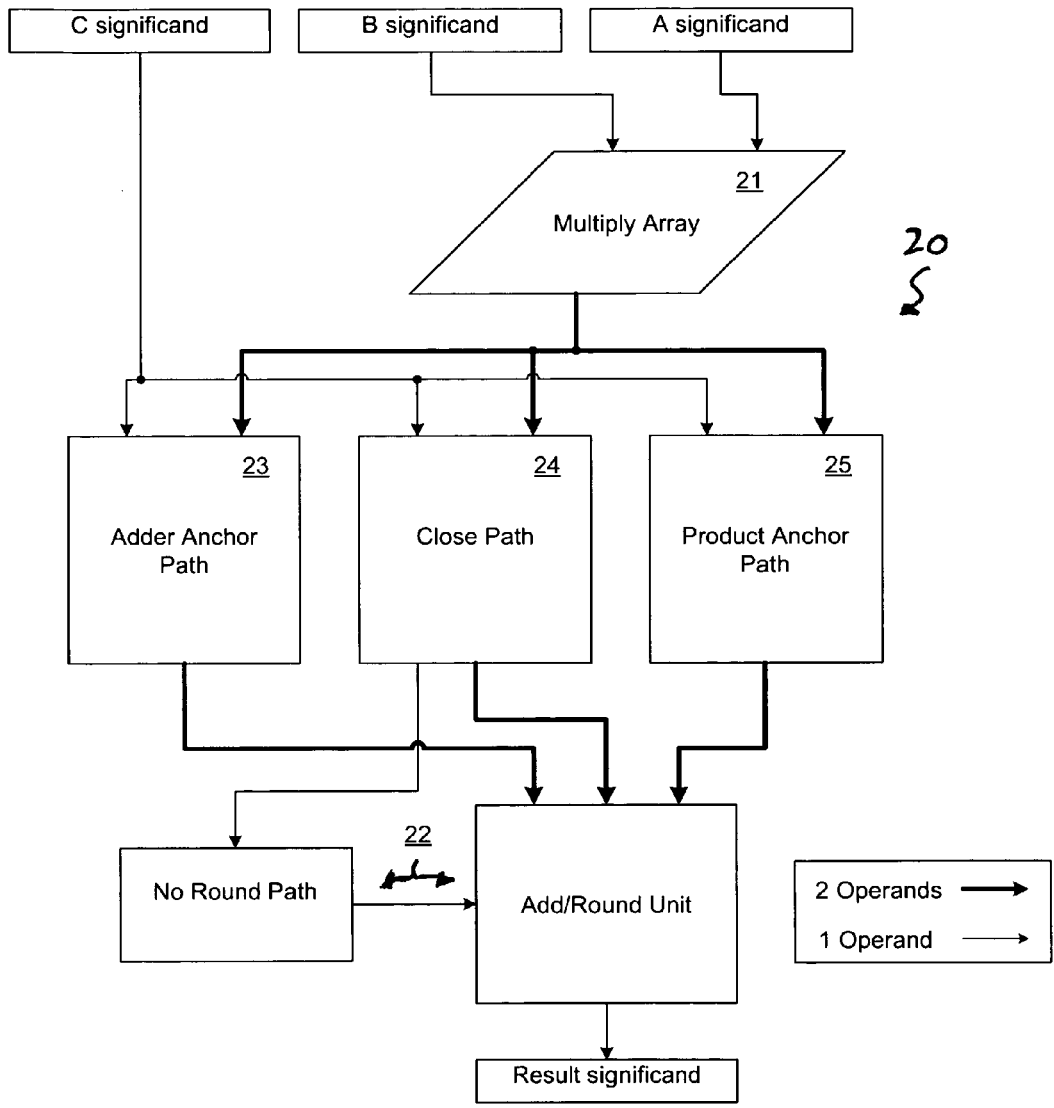
FIG. 2 is a block diagram of a three-path fused multiply-adder, in accordance with a preferred embodiment of the present invention.

Referring now to FIG. 2, there is depicted a block diagram of a three-path fused multiply-adder, in accordance with a preferred embodiment of the present invention. As shown, a three-path fused multiply-adder 20 splits the data-path following a CSA tree 21 into three paths, namely, an adder anchor path 23, a product anchor path 25, and a close path 24, with each path being designed with different data "anchors". Such partitioning of anchor cases removes the need for a massive aligner component as well as a complementing stage (i.e., complementer 16) in the prior art fused multiply-adder shown in FIG. 1. Instead, the design partitions point alignments and correct inversions at local levels. Following a path selection, the activated block processes and prepares the numerical data for a combined add/round unit 22. Combined add/round unit 22 removes the requirement for a massive adder followed by another addition/increment unit for the purpose IEEE-754 rounding.

Figure 3:
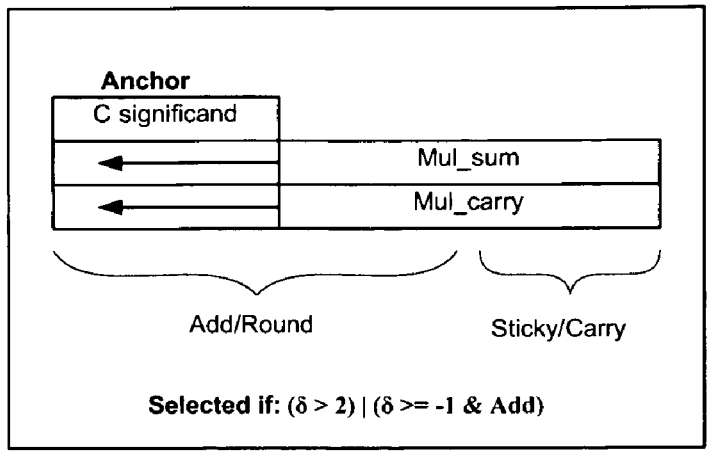
FIG. 3 is a block diagram of an adder anchor path of the fuse multiply-adder from FIG. 2, in accordance with a preferred embodiment of the present invention.
Figure 3:
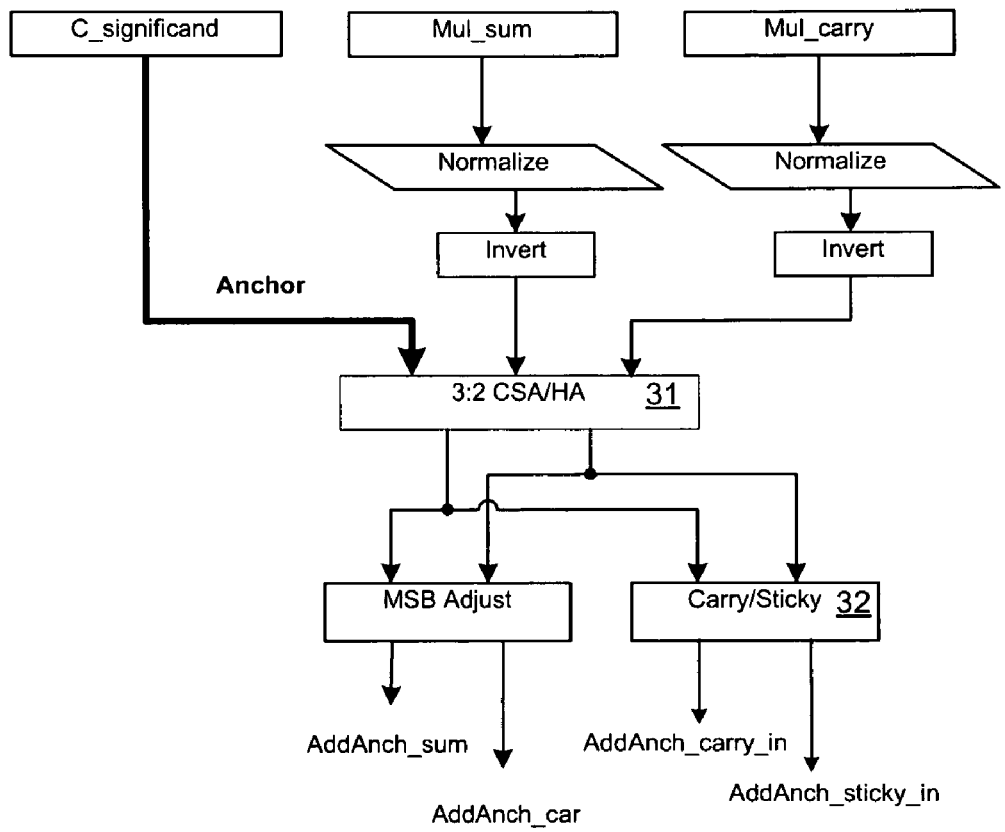

Referring now to FIG. 3, there is depicted a block diagram of adder anchor path 23 of fused multiply-adder 20, in accordance with a preferred embodiment of the present invention. Adder anchor path 23 is selected when the exponent difference detects a larger adder operator. For this case, the adder operand is anchored. The later arriving product terms are then normalized over the adder bit range and inverted for subtracts. Following inversion stages, all three operands are combined in 3:2 CSAs (or half-adders) 31. The most significant bits (MSBs) of both results are passed to logic for corner-case correction, and the lower bits are thrown to a carry/sticky tree 32, as the least significant bits (LSBs) will never be selected in the final result.

Adder anchor path 23 finalizes with two operators ready for addition and rounding as well as an input carry and sticky bit generated by the discarded lower bits. Since adder anchor unit 23 is not on a critical path of fuse multiply-adder 20, there is sufficient time to normalize the product terms.

Figure 4:
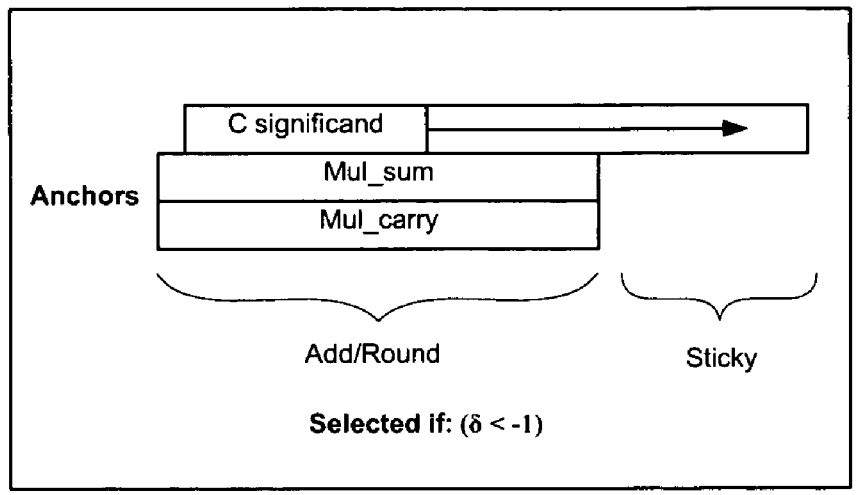
FIG. 4 is a block diagram of a product anchor path of the fuse multiply-adder from FIG. 2, in accordance with a preferred embodiment of the present invention.
Figure 4:
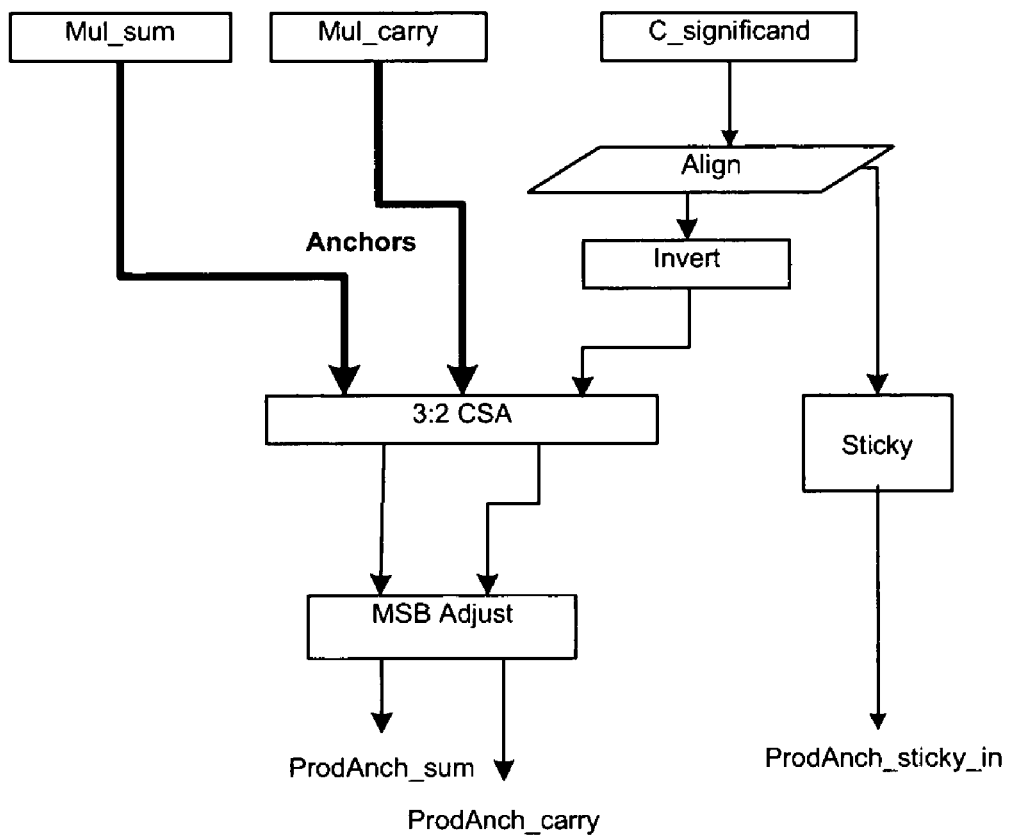

With reference now to FIG. 4, there is depicted a block diagram of product anchor path 25 of fuse multiply-adder 20, in accordance with a preferred embodiment of the present invention. Product anchor path 25 is the complement of adder anchor path 23, and is enabled when the exponent difference determines that the product terms from CSA tree 21 (from FIG. 2) are larger than the addition operator. The addition operand is aligned and inverted against the position of the product anchors. When the product terms arrive from CSA tree 21, all the data is combined in a 3:2 CSA, adjusted and sent in sum/carry form to add/round unit 22 (from FIG. 2).

For cases when the exponent difference between the adder operand and the product from CSA tree 21 is too close to easily determine a larger operand, all data is passed to close path 24. Close path 24 only handles subtraction operations of fuse multiply-adder 20, and is geared specifically for the classic arithmetic cases of massive cancellation.

Figure 5:
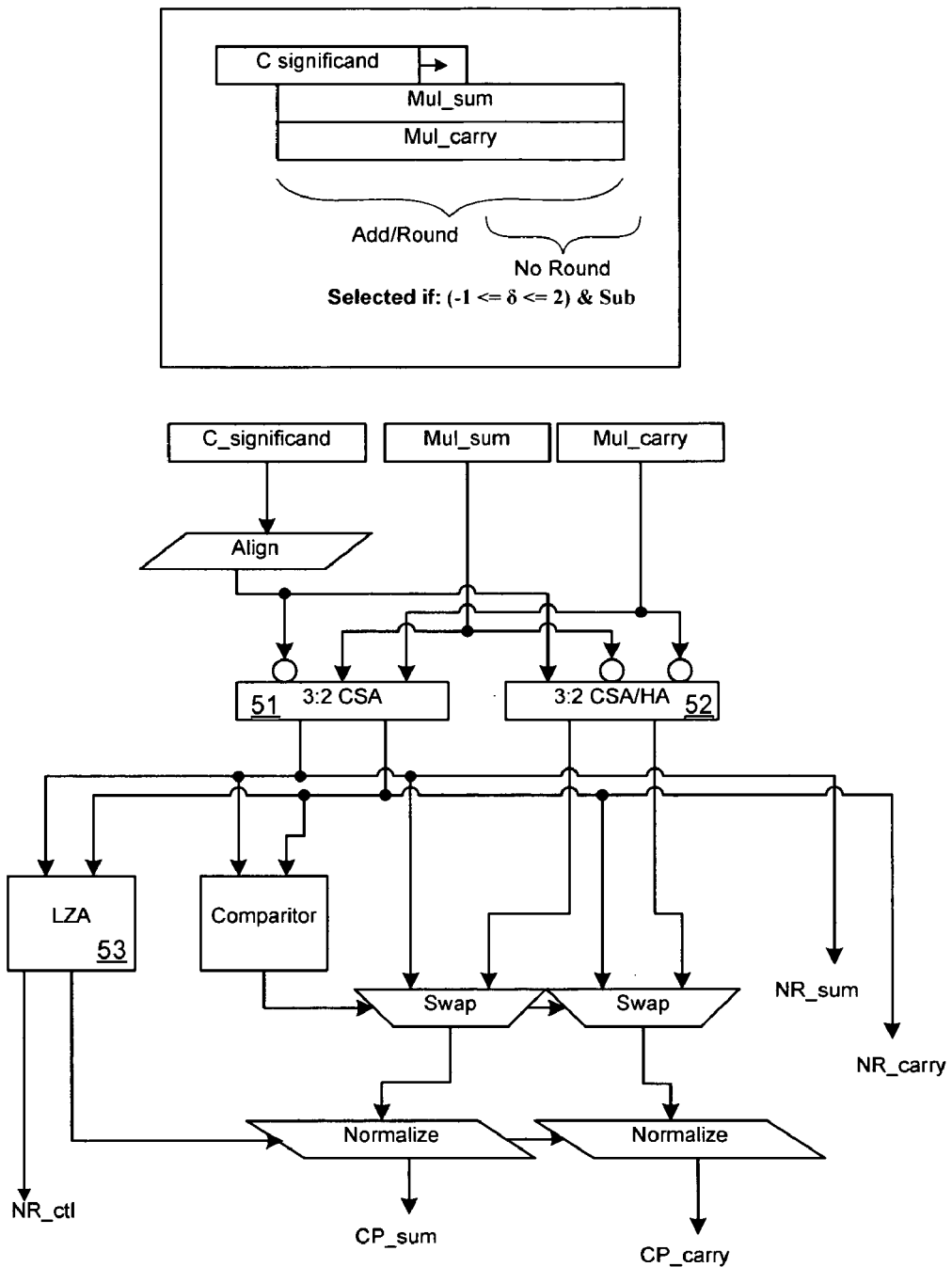
FIG. 5 is a block diagram of a close path of the fuse multiply-adder from FIG. 2, in accordance with a preferred embodiment of the present invention.

Referring now to FIG. 5, there is depicted a block diagram of close path 24 of fuse multiply-adder 20, in accordance with a preferred embodiment of the present invention. Close path 24 accomplishes this constraint via mantissa swapping. First, close path 24 uses 3:2 CSAs and half-adders 51-52 to combine an inverted aligned adder operand with the product terms. Likewise, the logically opposite term is also generated with inverted product operands and an un-complemented adder term.

The first 3:2 combination is passed to a comparator to determine which operators are truly larger. The comparator result signals the swap multiplexors to choose the correct inversion combination and the results are normalized in preparation for addition and rounding. An LZA 53 that controls this normalization is passed only one combination of inversion inputs, as its functionality is not affected by which operator is larger. It should be noted that depending on the addition/rounding scheme selected, the one-bit LZA correction shift may be handled in add/round unit 22 (from FIG. 2).

Since close path 24 is the critical timing arc, the bit-sizes of the high-latency components need to be shrunk. Specifically, the original LZA and normalize bit sizes are reduced to half of their original range. Logically, such reduction is a legal move, as cases of massive cancellation exceeding roughly an original operand bit size in length will produce a result that needs no rounding. This "no round" case is triggered by the LZA "1's detection" term. If selected, data enters the no round path and performs an addition and normalization in a block parallel to add/round unit 22 (from FIG. 2).

All three paths 23-25 prepare the data in identical format that is conducive to a normalized add/round stage. The combined addition and rounding stage algorithm selected for the final block come from pieces of various suggestions for the add/round stages of a floating-point multiplier. However, modifications were also added to the control logic, signals, and multiplexor sizes to account for fuse multiply-adder functionality. Finally, a no round path has also been added in parallel to the scheme to handle the extra output case from close path 24.

Figure 6:
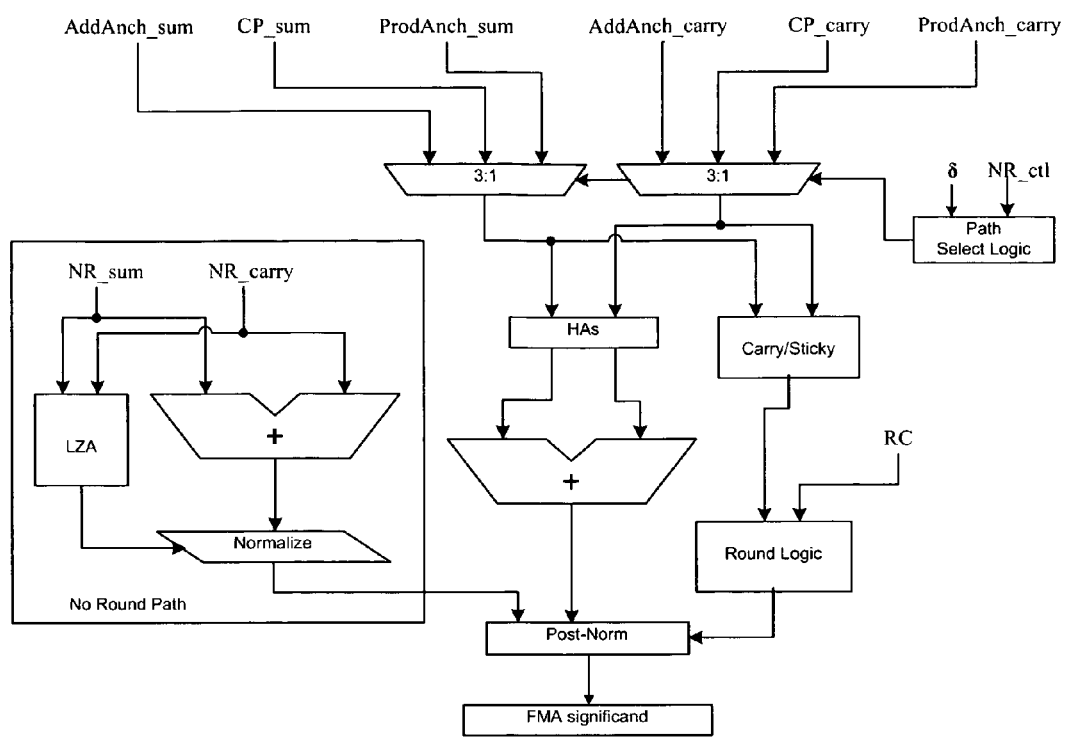
FIG. 6 is a block diagram of a combined fused multiply-adder add/round stage, in accordance with a preferred embodiment of the present invention.

With reference now to FIG. 6, there is depicted a block diagram of a combined fuse multiply-adder add/round stage, in accordance with a preferred embodiment of the present invention. The stage begins by a control block selecting one of the three paths and directing the data to the add/round scheme. After the data is selected, rounding occurs with a common floating-point multiplier rounding algorithm by using a selection of half-adders, an augmented/compound adder, carry/sticky logic, and rounding logic. The rounded result is post-normalized and latched.

In the case of the selection of close path 24 with the "no round" signal assertion, the no round data inputs are added and normalized in a path separate and parallel to add/round unit 22 (from FIG. 2). The result from this "no round path" is forwarded to the add/round result multiplexor, post-normalized, and latched. When either the no round path result or add/round result is latched, the fused multiply-add instruction is complete and data exits the unit.

What is claimed is:

1. A fused multiply-adder circuit comprising:
a multiplier for multiplying a first operand and a second operand to generate a product;
an adder anchor path for shifting said product with respect to a third operand;
a product anchor path for shifting said third operand with respect to said product;
a close path for normalizing a difference between said product and said third operand; and
an add/round module for selecting and finishing an output from one of said paths to generate a result.

* * * * *